(12) United States Patent
Atake (10) Patent No.: US 8,033,807 B2
(45) Date of Patent: Oct. 11, 2011

(54) APPARATUS AND METHOD FOR MOLDING OF DECORATIVE MOLDED ARTICLE

(75) Inventor: Hiroyuki Atake, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 816 days.

(21) Appl. No.: 10/569,229

(22) PCT Filed: Aug. 26, 2004

(86) PCT No.: PCT/JP2004/012274
§ 371 (c)(1),
(2), (4) Date: Feb. 23, 2006

(87) PCT Pub. No.: WO2005/021233
PCT Pub. Date: Mar. 10, 2005

(65) Prior Publication Data
US 2007/0007690 A1   Jan. 11, 2007

(30) Foreign Application Priority Data

Aug. 27, 2003  (JP) ................................ 2003-303279
Jun. 30, 2004  (JP) ................................ 2004-193464

(51) Int. Cl.
*B23B 23/00* (2006.01)
(52) U.S. Cl. ..................... 425/126.1; 425/122; 425/125; 425/451.9; 425/400; 264/259; 264/266; 264/275; 264/132
(58) Field of Classification Search .................. 264/275; 425/125, 126.1, 451.9
See application file for complete search history.

(56) References Cited

U.S. PATENT DOCUMENTS

| | | | | |
|---|---|---|---|---|
| 5,925,302 A | * | 7/1999 | Oono et al. | 264/267 |
| 6,045,738 A | * | 4/2000 | Atake | 264/266 |
| 6,325,607 B1 | * | 12/2001 | Atake | 425/122 |
| 6,835,266 B2 | * | 12/2004 | Alawadi et al. | 156/221 |
| 2001/0028129 A1 | * | 10/2001 | Oono et al. | 264/219 |
| 2002/0058144 A1 | * | 5/2002 | Mori et al. | 428/412 |

FOREIGN PATENT DOCUMENTS

| | | | |
|---|---|---|---|
| JP | 60-220718 A | | 11/1985 |
| JP | 05278065 A | * | 10/1993 |
| JP | 9-39025 A | | 2/1997 |
| JP | 09039025 A | * | 2/1997 |
| JP | 10-156875 A | | 6/1998 |
| JP | 11-34104 A | | 2/1999 |
| JP | 11034104 A | * | 2/1999 |
| JP | 2000-301566 A | | 10/2000 |

* cited by examiner

Primary Examiner — Yogendra Gupta
Assistant Examiner — Amjad Abraham
(74) Attorney, Agent, or Firm — Sughrue Mion, PLLC (57) ABSTRACT

A foil-decorating injection molding apparatus having a male mold, a female mold, a transport chuck for feeding a decorative sheet S between the male mold and the female mold, and a clamper for pressing and fastening the decorative sheet onto a parting surface of the female mold. The transport chuck consists of two clamping devices each clamping a side edge of the decorative sheet. The clamper consists of a pressing frame and a connecting member. When the pressing frame is in abutment with the female mold, a space is provided between the connecting member and the female mold in which the clamping devices can pass through. After the decorative sheet is fed by the clamping chuck, the sheet can be fastened by the clamper without waiting until the chuck is brought back to an initial standby position, thereby reducing the manufacturing time.

6 Claims, 13 Drawing Sheets

APPARATUS AND METHOD FOR MOLDING OF DECORATIVE MOLDED ARTICLE

TECHNICAL FIELD

The present invention relates to a foil-decorating injection molding apparatus and method for integrally bonding a decorative sheet carrying patterns or letters or the like to the surface of an injection molded resin article within a mold while simultaneously performing an injection molding, thereby obtaining a decorative molded article.

BACKGROUND ART

Figure 8:
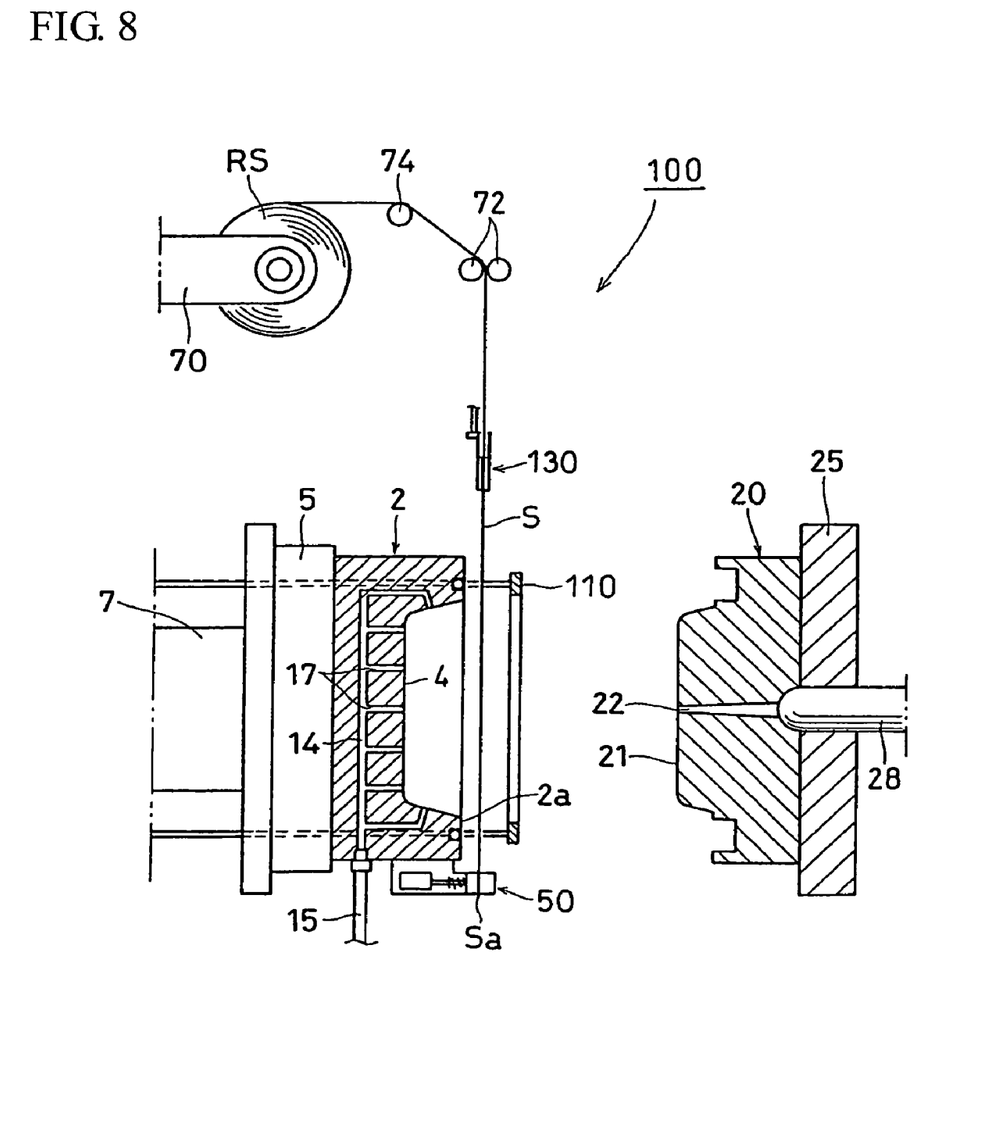
FIG. 8 shows a cross section of a foil-decorating injection molding apparatus according to prior art.
Figure 9:
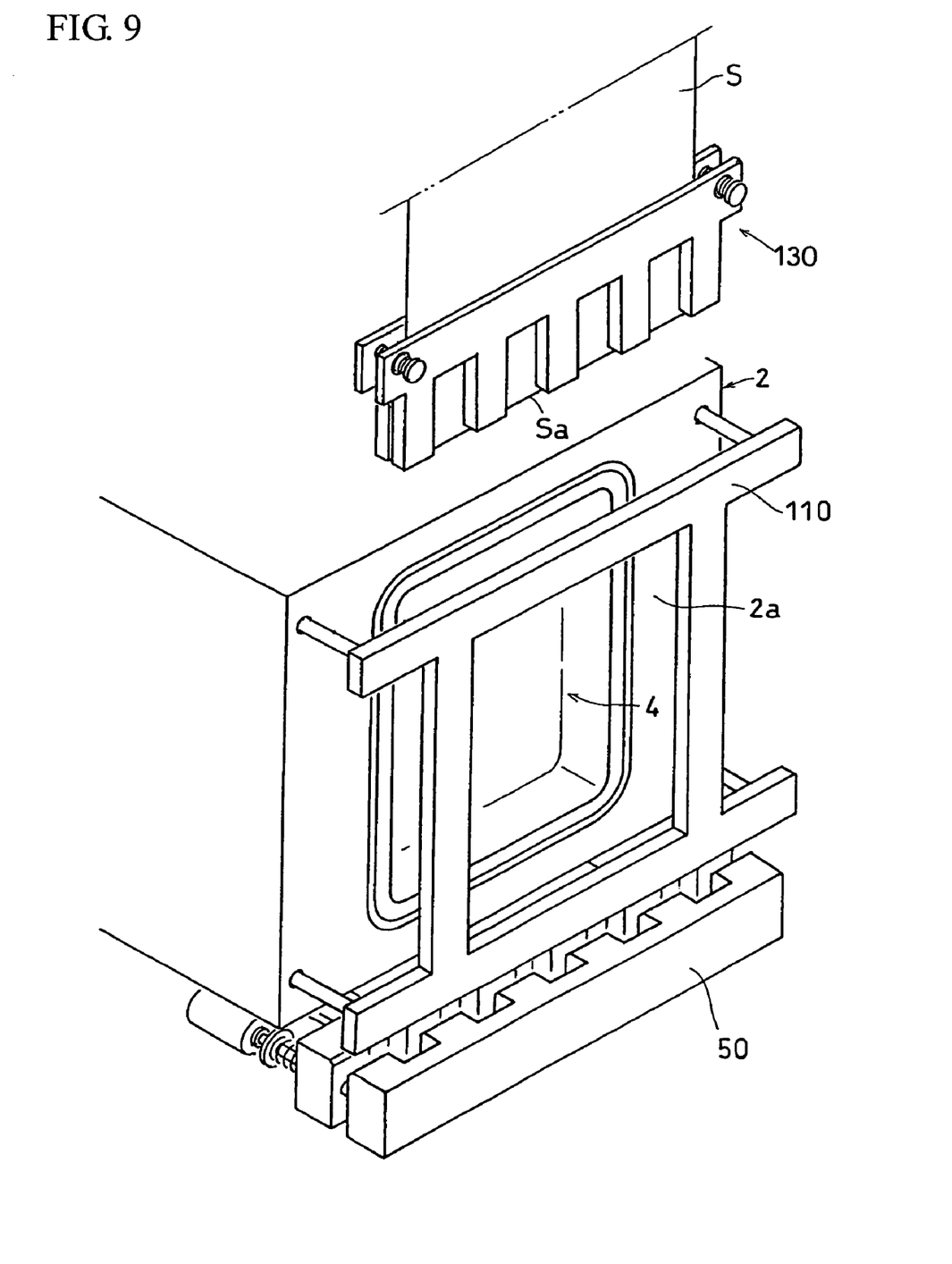
FIG. 9 shows a perspective view of the apparatus shown in FIG. 8 near the female mold.

Integrally bonding a decorative sheet to the surface of an injection molded resin article simultaneously with the injection molding thereof has conventionally been performed (see Patent Document 1, for example). FIG. 8 shows a foil-decorating injection molding apparatus disclosed in Patent Document 1, and FIG. 9 shows a perspective view of a portion of the apparatus in the vicinity of a female mold. The foil-decorating injection molding apparatus 100 comprises the female mold 2 with a contour corresponding to a desired article to be obtained, and a male mold 20. The bottom of the female mold 2 is fixed to a movable platen 5 such that the female mold 2 can be moved towards or away from the male mold 20 by a fluid pressure cylinder ram 7.

The female mold 2 is formed with a cavity 4 with a contour corresponding to the shape of the desired article to be obtained. In the cavity 4, there are bored vacuum suction holes 17 that open out to the cavity 4 and which lead to an external vacuum pump via a vacuum suction passageway 14 bored in a bottom portion of the female mold 2 and via a conduit 15. The female mold 2 is also fitted with a rectangular frame clamper 110 for pressing and fastening a decorative sheet S onto a parting surface 2a of the female mold 2.

On the other hand, the male mold 20 is fixed to a fixed panel 25 in which a nozzle 28 of an injection molding machine is mounted. The male mold 20 is provided with a protruding portion (core) 21 at the center corresponding to the shape of the article. In the protruding portion 21, there is formed a runner 22 for injecting a molten resin into the cavity 4 of the female mold 2 via the nozzle 28 of the injection molding machine.

Above the female mold 2, there are provided a reel 70, a guide roller 74, and a pair of feed rollers 72 for winding and rewinding an elongated band of a decorative sheet RS that is wound in a roll. A transport chuck 130 is disposed between the feed roller 72 and the female mold 2 for feeding a decorative sheet S onto the parting line 2a of the female mold 2. On the lower side of the female mold 2, there is disposed a receiving chuck 50 for receiving an end Sa of the decorative sheet S that has been transported via the transport chuck 130.

When performing an injection molding and foil decoration simultaneously using this apparatus 100, the elongated band of the decorative sheet RS wound in a roll is drawn out by the feed rollers 72. A decorative sheet S is then clamped by the transport chuck 130 near the end Sa of the sheet, as shown in FIG. 9. The transport chuck 130 is then transported vertically downward in a plane parallel to the parting surface 2a of the female mold 2, until the very tip of the end Sa of the decorative sheet S protrudes downward just a little beyond the lower end of the receiving chuck 50.

Figure 10:
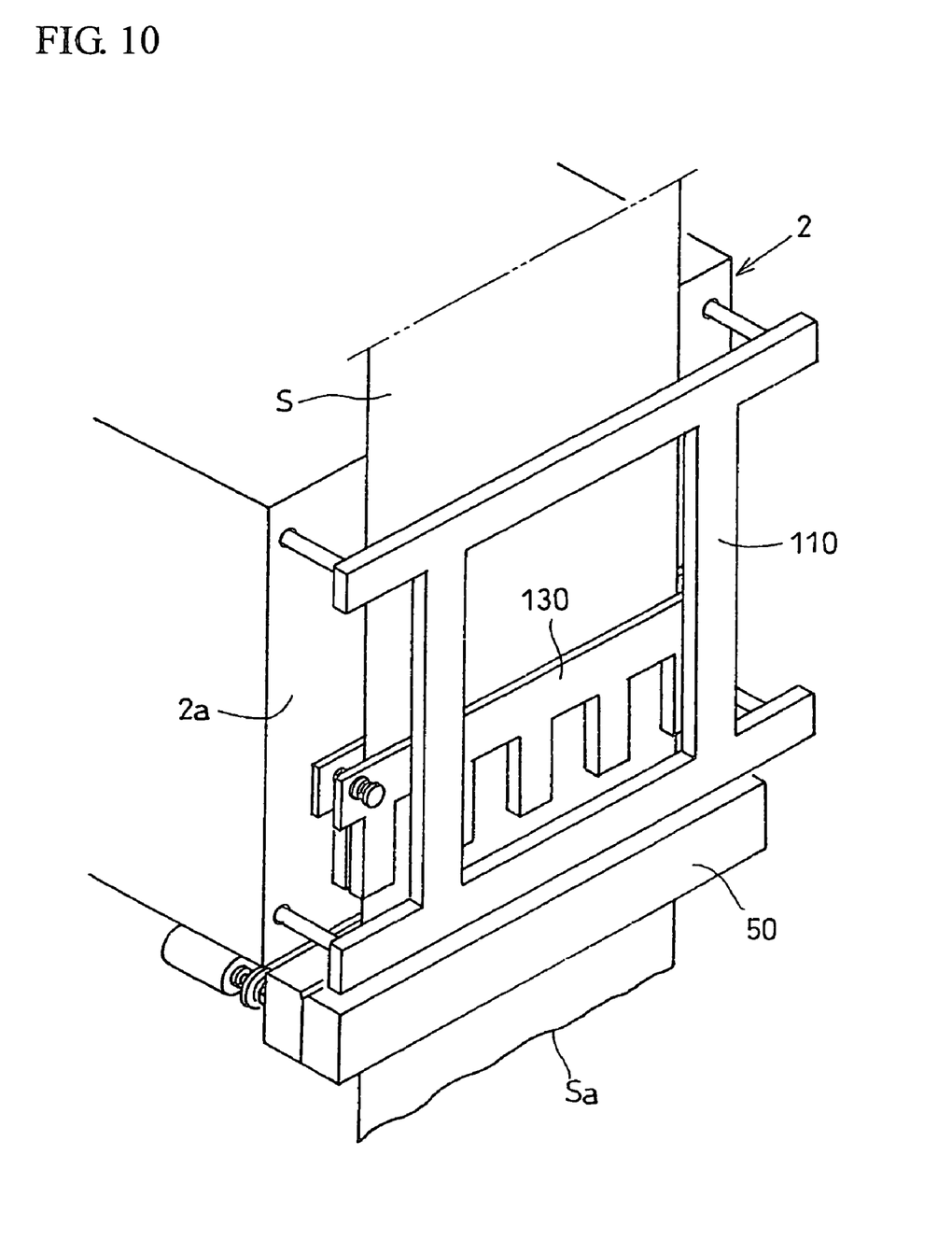
FIG. 10 shows a view of the apparatus shown in FIG. 8 for describing a transport chuck moving step.
Figure 11:
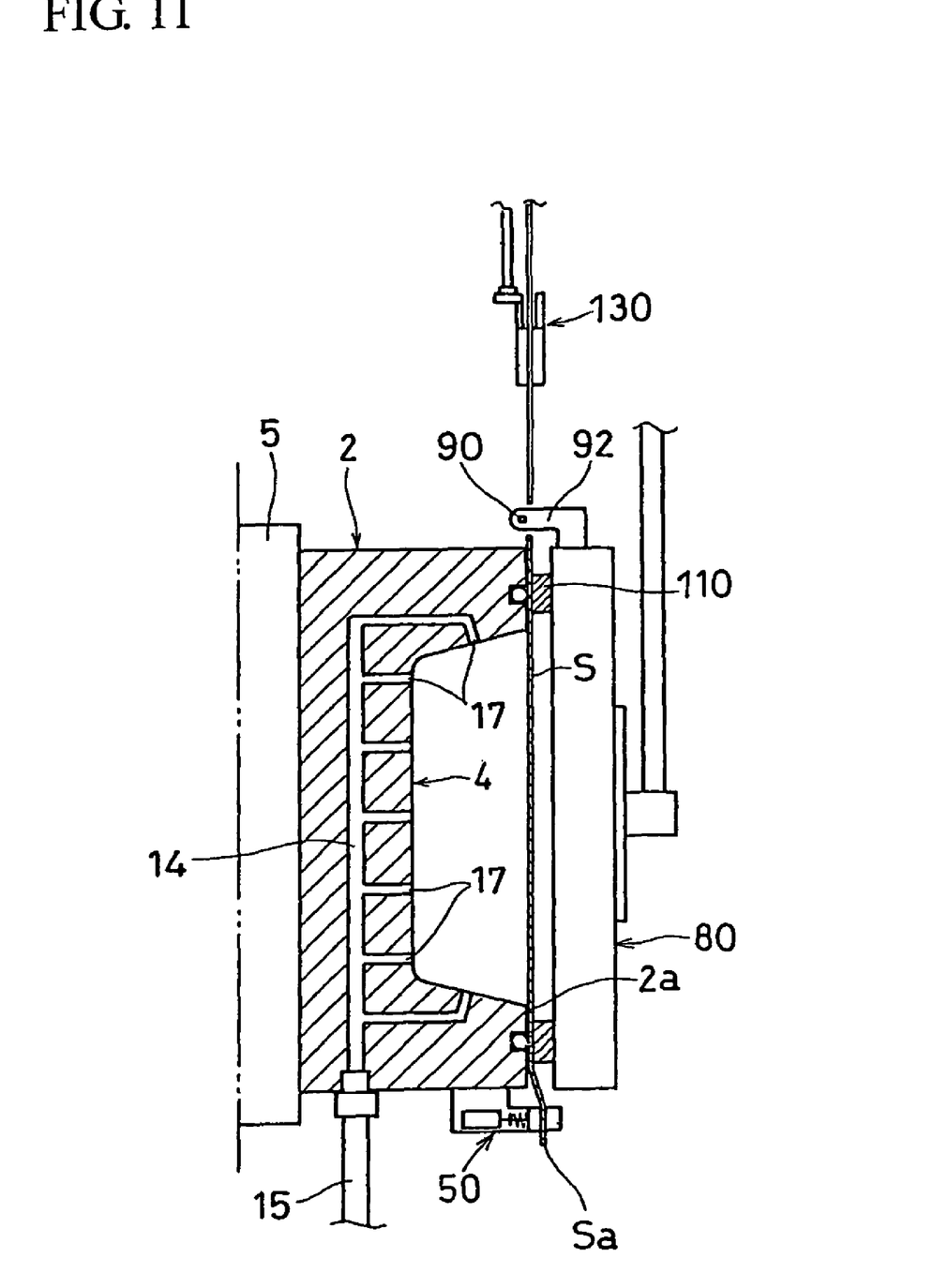
FIG. 11 shows a view of the apparatus shown in FIG. 8 for describing a heating and softening step.

Then, the end Sa of the decorative sheet S is grasped by the receiving chuck 50, and, as shown in FIG. 10, the transport chuck 130 is released, raised, and brought back to the initial standby position shown in FIG. 9. The decorative sheet S is then pressed and fastened onto the parting surface 2a of the female mold 2 by the clamper 110. Thereafter, a heating panel 80 that has been withdrawn from the areas between the female and male molds is now brought closer to the clamper 110 until it is directly opposite thereto so that it can heat and soften the decorative sheet S, as shown in FIG. 11.

Figure 12:
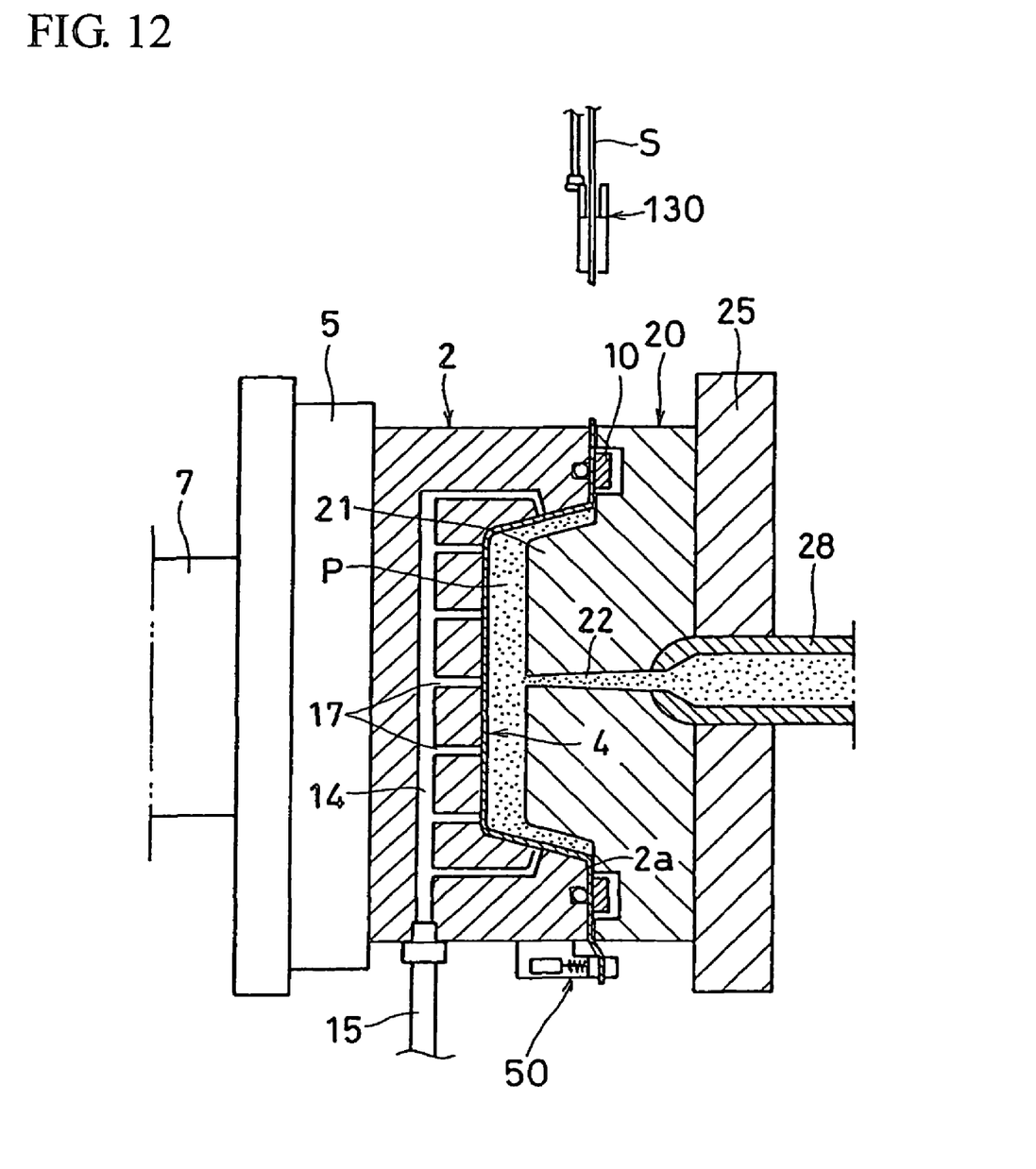
FIG. 12 shows a view of the apparatus shown in FIG. 8 for describing an injection molding step.

A heated-wire type sheet cutter 90 is provided on the upper end of the heating panel 80 via an L-shaped support member 92 such that the cutter 90 protrudes beyond the heating panel 80 and the clamper 110 towards the female mold 2. As the heating panel 80 is moved and brought into contact with the clamper 110, the decorative sheet S is cut in the direction of the width thereof by the sheet cutter 90, and a single-shot length of the decorative sheet S at its end can be cut off from the upstream portion of the sheet. The tip portion of the decorative sheet S from which the single-shot length has been cut off is later wound back to the position (see FIG. 12) where it is grasped by the transport chuck 130 in preparation for the next shot.

Simultaneous with, or immediately after the decorative sheet S heating/softening step, the decorative sheet S is vacuum-sucked via the vacuum suction holes 17 formed in the female mold 2 so that the decorative sheet S is stretched in conformity with the cavity 4 of the female mold 2 in an airtight manner. Following this stretching step, the female mold 2 is moved towards the male mold 20 for mold clamping in a mold clamping step. This is followed by an injection molding step (see FIG. 12) in which an injection molding resin in a molten or in an uncured, liquid state is injected into the cavity 4 formed between the female mold 2 and the male mold 20 via the runner 22 in the male mold 20. A mold opening step is then conducted in which the female mold 2 and the male mold 20 are separated, followed by a removal step in which a molded article P to which the decorative sheet S is integrally bonded is removed from the female mold 2.

The decorative sheet may employ either a laminate sheet or a transfer sheet, depending on the type of the desired product. In the case of using a laminate sheet, the laminate sheet per se will have been foil-decorated by injection molding, resulting in the entire layers of the sheet being integrally bonded to the surface of the injection molded resin article and creating a pattern layer. On the other hand, when the decorative sheet is a transfer sheet, a support sheet is peeled from the pattern sheet that has been integrally bonded to the surface of the injection molded resin article, whereby only a transfer layer of the pattern layer, for example, is left behind on the injection molded resin article, thereby creating a pattern layer and completing the foil-decorating process.

Figure 13:
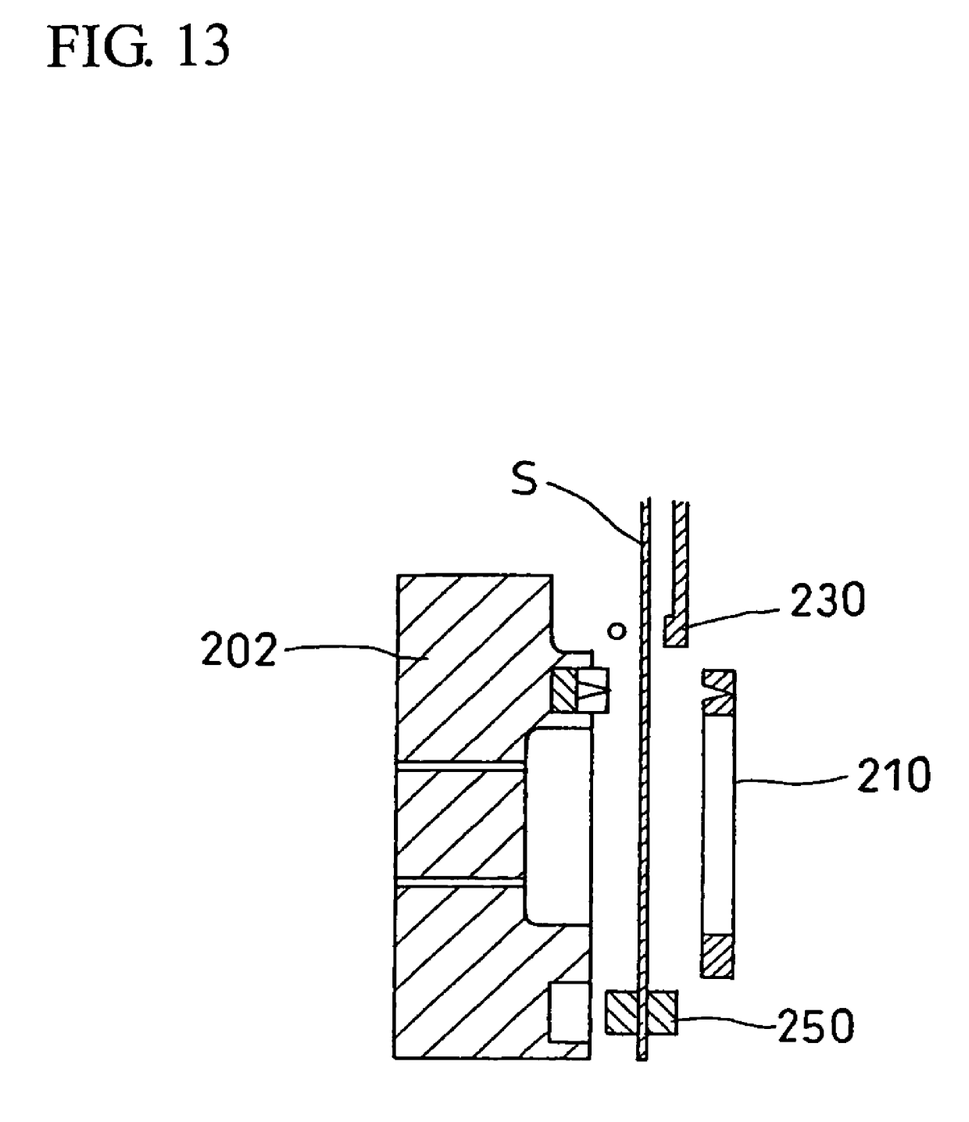
FIG. 13 shows a cross section of a major portion of another foil-decorating injection molding apparatus according to prior art.

Instead of the receiving chuck 50 in the above-described apparatus 100, a second clamper may be provided adjacent to the first clamper (see Patent Document 2, for example). FIG. 13 shows a major portion of the foil-decorating injection molding apparatus disclosed in Patent Document 2, where a second clamper 250 is provided beneath and adjacent the first clamper 210. In this apparatus, the decorative sheet S that has been fed onto a female mold 202 by a transport chuck 230 is grasped by the second clamper 250 and, after the transport chuck 230 has been returned to the initial standby position as shown, the decorative sheet S is pressed and fastened onto the female mold 202 by the first clamper 210.

(Patent Document 1) Japanese Patent No. 3093159
(Patent Document 2) Japanese Patent No. 2714258

DISCLOSURE OF THE INVENTION

In the above-described foil-decorating injection molding apparatuses disclosed in Patent Documents 1 and 2, after the decorative sheet S has been fed by the transport chuck 130 or 230, the decorative sheet S cannot be fastened by the clamper 110 or 210 until the transport chuck 130 or 230 is brought back to the initial standby position, resulting in a longer production time. Further, they required means for grasping the decorative sheet S, such as the receiving chuck 50 or the second clamper 250, until the transport chuck 130 or 230 is brought back to the initial standby position.

Furthermore, for the receiving chuck 50 to be able to grasp the decorative sheet S, the decorative sheet S must be drawn out more than is necessary for covering the cavity 4, resulting in a waste of the sheet. The extra length of the decorative sheet S that must be drawn out can be reduced somewhat by the structure in Patent Document 2 in which the second clamper 250 is disposed adjacent the first clamper 210. However, in this case too, some waste of the sheet is inevitable, and this structure has the problem that the structure of the clampers as well as their drive mechanism is complex.

The invention has been made with a view to solve the aforementioned problems of the prior art, and it is an object of the invention to provide a foil-decorating injection molding apparatus and method whereby, after a decorative sheet has been fed by a transport chuck, the sheet can be fastened by the clamper without having to wait until the chuck is brought back to the initial standby position, thereby reducing the time necessary for manufacture. It is another object of the invention to minimize the length of the decorative sheet that is fed for the production of a single decorative molded article so as to eliminate the waste of the decorative sheet.

In order to achieve these objects, the invention provides a foil-decorating injection molding apparatus comprising at least a male mold, a female mold, a transport chuck for feeding a decorative sheet between the male mold and the female mold, and a clamper for pressing and fastening the sheet on a parting surface of the female mold, wherein:

the transport chuck comprises two clamping devices by which both side edges of the decorative sheet can be clamped; and the clamper comprises a pushing frame that abuts on the parting surface of the female mold via the decorative sheet when the decorative sheet is pressed and fastened, and at least one connecting member connecting the pushing frame and means of driving the pushing frame, wherein:

the clamper is formed in such a shape that, when the pushing frame is in abutment with the parting surface of the female mold, there is established a space between the connecting member and the parting surface in which the clamping devices can pass through.

The invention also provides a foil-decorating injection molding method that employs the aforementioned foil-decorating injection molding apparatus, the method comprising feeding the decorative sheet between the male mold and the female mold by moving the clamping devices of the transport chuck with the decorative sheet being clamped by the clamping devices, pressing and fastening the sheet onto the parting surface of the female mold by the clamper, releasing the grasping of the sheet by the clamping devices while maintaining the pressed state, and bringing the clamping devices back to their original position through the space between the clamper and the female mold.

In accordance with the foil-decorating injection molding apparatus of the invention, even when the decorative sheet is being pressed by the clamper, a space can be established between the clamper and the female mold through which the clamping devices can pass. Thus, the transport chuck can be moved in front of the female mold with the decorative sheet being pressed and fastened by the clamper. Therefore, in accordance with the foil-decorating injection molding method of the invention, after the decorative sheet has been fed in front of the female mold by the transport chuck, the decorative sheet is pressed and fastened by the clamper and then the transport chuck can be brought back to its initial standby position. While the transport chuck is being brought back to the initial standby position, another step, such as that of heating the sheet, can be simultaneously performed, thereby reducing the manufacturing time. Further, such a method of feeding and fixing the decorative sheet eliminates the need for the receiving chuck or the like that is found in the conventional foil-decorating injection molding apparatuses, so that the apparatus can be simplified. This also eliminates the need for unreeling the decorative sheet for an extra length up to the position of the grasping means, such as the conventional receiving chuck, thereby eliminating the waste in the decorative sheet.

In a preferable embodiment, the transport chuck is movable in the direction perpendicular to the direction in which the male mold and the female mold move towards and away from each other, the position of the transport chuck is fixed with respect to the female mold in the aforementioned direction, and the decorative sheet is fed from a reel fixed to the female mold. In this embodiment, when the female mold is moved forward or backward with respect to the male die, the transport chuck and the reel also move along with the female mold and therefore the distance between the parting surface of the female mold and the decorative sheet can be maintained to be constant. Accordingly, the decorative sheet can be fed by the transport chuck even during the forward or backward movement of the female mold. As a result, when the female mold and the male mold are separated in a die separating step after a single molded article has been injection-molded using the apparatus of the invention, a new decorative sheet can be fed simultaneously, thereby further reducing the manufacturing time. The reel may be fixed to the female mold not only directly but also indirectly using an appropriate member. Normally, a mount or the like is installed on the movable platen to which the bottom of the female mold is fixed, and the transport chuck drive unit or the reel are fixedly mounted on the mount.

As needed, a heating panel for heating and softening the decorative sheet may be fixed to the female mold, in addition to the aforementioned drive unit and the reel. The heating panel may be movably attached to the female mold via a suitable member. During injection molding, the heating panel is withdrawn outside the areas between the female and male molds, and it is moved in front of the parting surface of the female mold during the subsequent die opening step. By thus moving the heating panel simultaneously during the die opening step, the manufacturing time can be further shortened.

BEST MODE FOR CARRYING OUT THE INVENTION

Figure 1:
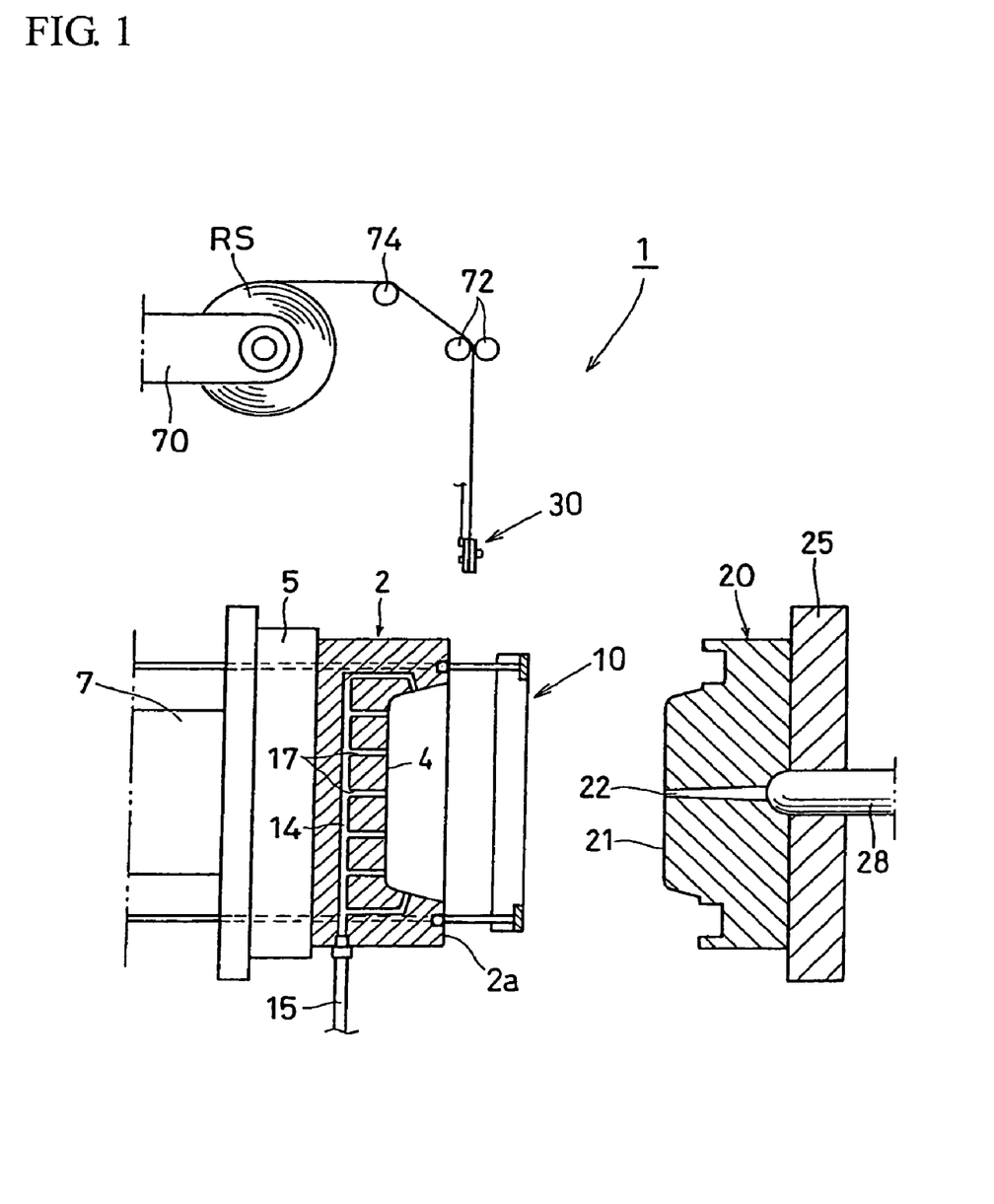
FIG. 1 shows a cross section of an embodiment of the foil-decorating injection molding apparatus of the invention.

The invention will be hereafter described by way of embodiments thereof with reference made to the drawings. FIG. 1 shows an embodiment of the foil-decorating injection molding apparatus of the invention. The foil-decorating injection molding apparatus 1 is similar to the conventional apparatus 100 (FIG. 8) in many parts, such as the female mold and the male mold, and these common parts will be referenced by similar numerals and will not be described.

Figure 2:
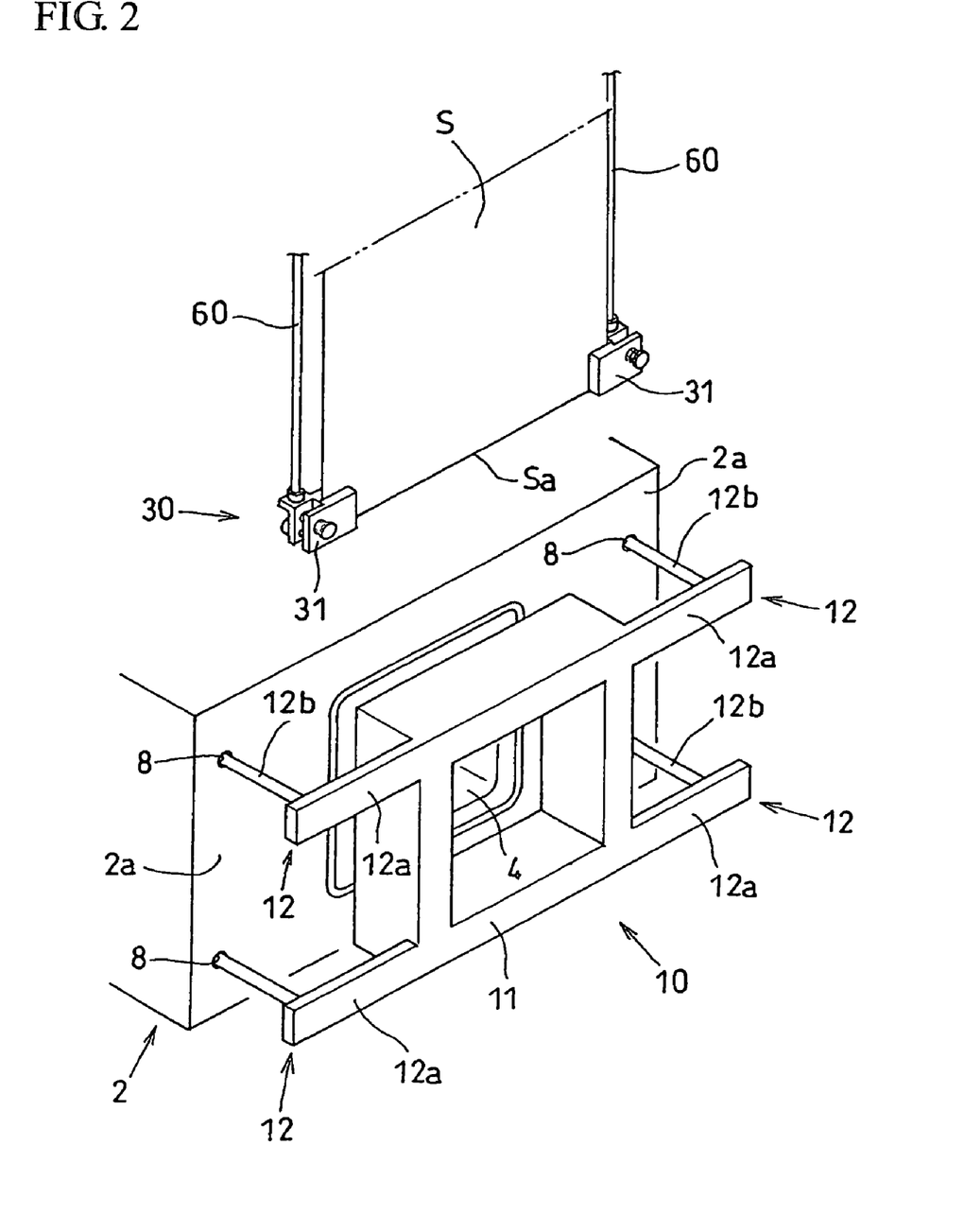
FIG. 2 shows a perspective view of a portion of the apparatus shown in FIG. 1 in the vicinity of the female mold.

FIG. 2 shows a perspective view of a portion of the apparatus 1 shown in FIG. 1 in the vicinity of the female mold. As will be readily seen by comparing with FIG. 9, the apparatus 1 is characterized in the structure of a clamper 10 and a transport chuck 30. In addition, the apparatus is not provided with a grasping means, such as the receiving chuck, that has been found in the conventional apparatuses. Although in the present embodiment the male mold 20 and the female mold 2 are disposed opposite each other horizontally and a decorative sheet S is transported between them from top to bottom, this is merely an example and the invention is not limited thereby. For example, the male mold and the female mold may be disposed opposite each other vertically, and the decorative sheet S may be transported between them horizontally.

The transport chuck 30 in the present apparatus 1 consists of two clamping devices 31, 31 that grasp the left and right side edges of the decorative sheet S. These clamping devices 31, 31 are each mounted on the tip of two transport rods 60, 60 with axes parallel to a parting surface 2a of the female mold 2. Each transport rod 60 is coupled with a drive means (not shown) so that they can be moved in a plane parallel to the parting surface 2a along their axes, namely in the vertical direction.

Figure 3:
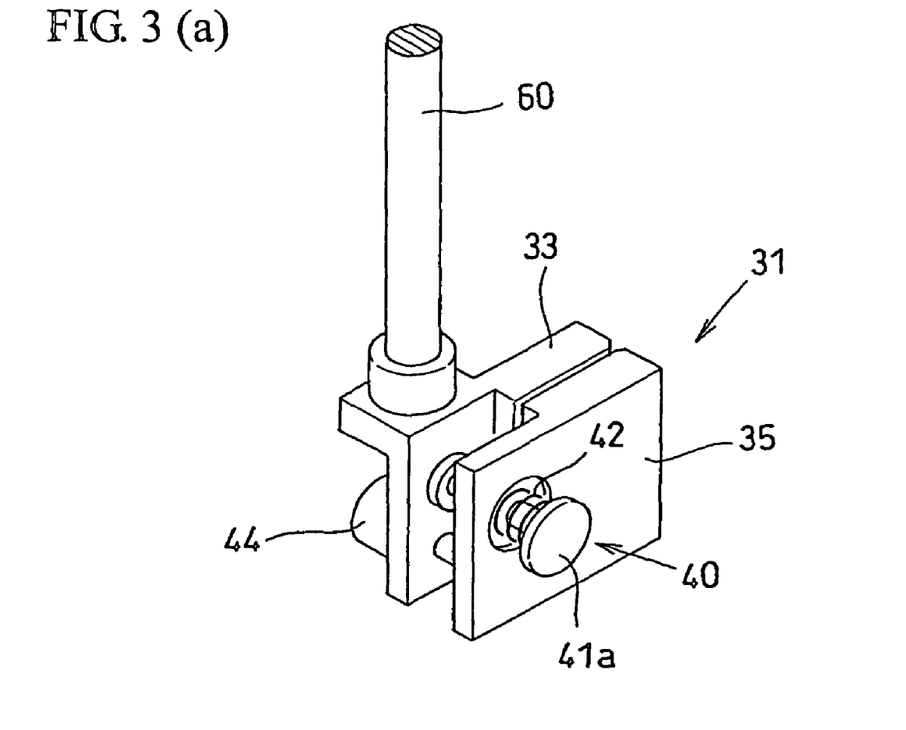
FIG. 3 shows an enlarged view of a transport chuck of the apparatus shown in FIG. 1.

FIG. 3(a) shows an enlarged perspective view of one of the clamping device 31 of the transport chuck 30. The clamping device 31 consists of a fixed-side clamping piece 33 and a movable-side clamping piece 35 that are disposed opposite one another. These clamping pieces 33 and 35 are coupled by a clamping device opening/closing mechanism 40. The fixed-side clamping piece 33 is attached to the tip of the transport rod 60, while the movable-side clamping piece 35 can be moved by the clamping device opening/closing mechanism 40 relative to the fixed-side clamping piece 33.

FIG. 3(b) shows a side view of the clamping device 31. The clamping device opening/closing mechanism 40 includes a guide support pin 41 with a flange 41a that is fixed to the fixed-side clamping piece 33 and that is loosely inserted in the movable-side clamping piece 35 and a guide sleeve 39. The clamping device opening/closing mechanism 40 also includes a coil spring 42 located in compression between the flange 41a of the guide support pin 41 and the movable-side clamping piece 35. It also includes an air cylinder 44 fixed to the fixed-side clamping piece 33 that can operate to move the movable-side clamping piece 35 via a piston rod 44a in a direction such that the movable-side clamping piece 35 can be moved away from the fixed-side clamping piece 33. The clamping device opening/closing mechanism 40 operates such that, when the air cylinder 44 is put in an inoperative state, the piston rod 44a is pushed into the cylinder 44 by the biasing force of the coil spring 42, resulting in a closed state in which the decorative sheet S is clamped by the fixed-side clamping piece 33 and the movable-side clamping piece 35. When the air cylinder 44 is put in an operating state, the piston rod 44a lifts the movable-side clamping piece 35 against the biasing force of the coil spring 42, whereby the clamping of the decorative sheet S is released to achieve an open state.

The clamper 10 consists of a rectangular pushing frame 11 that is adapted to abut on the parting surface 2a of the female mold 2 via the decorative sheet S as it is pressed and fastened, and four connecting members 12 by which the pushing frame 11 is connected to a drive means. Each of the connecting members 12 comprises four bridging portions 12a that extend from the four corners of the pushing frame 11 in parallel with the parting surface 2a of the female mold 2, and four connecting rods 12b that extend from the tip of each bridging portion 12a vertically towards the parting surface 2a of the female mold 2. Each connecting rod 12b is slidably inserted in a throughhole 8 provided in the female mold 2 near each corner thereof and is connected to a drive means (not shown), so that the pushing frame 11 can be moved forward and backward vertically with respect to the parting surface 2a of the female mold 2.

Figure 4:
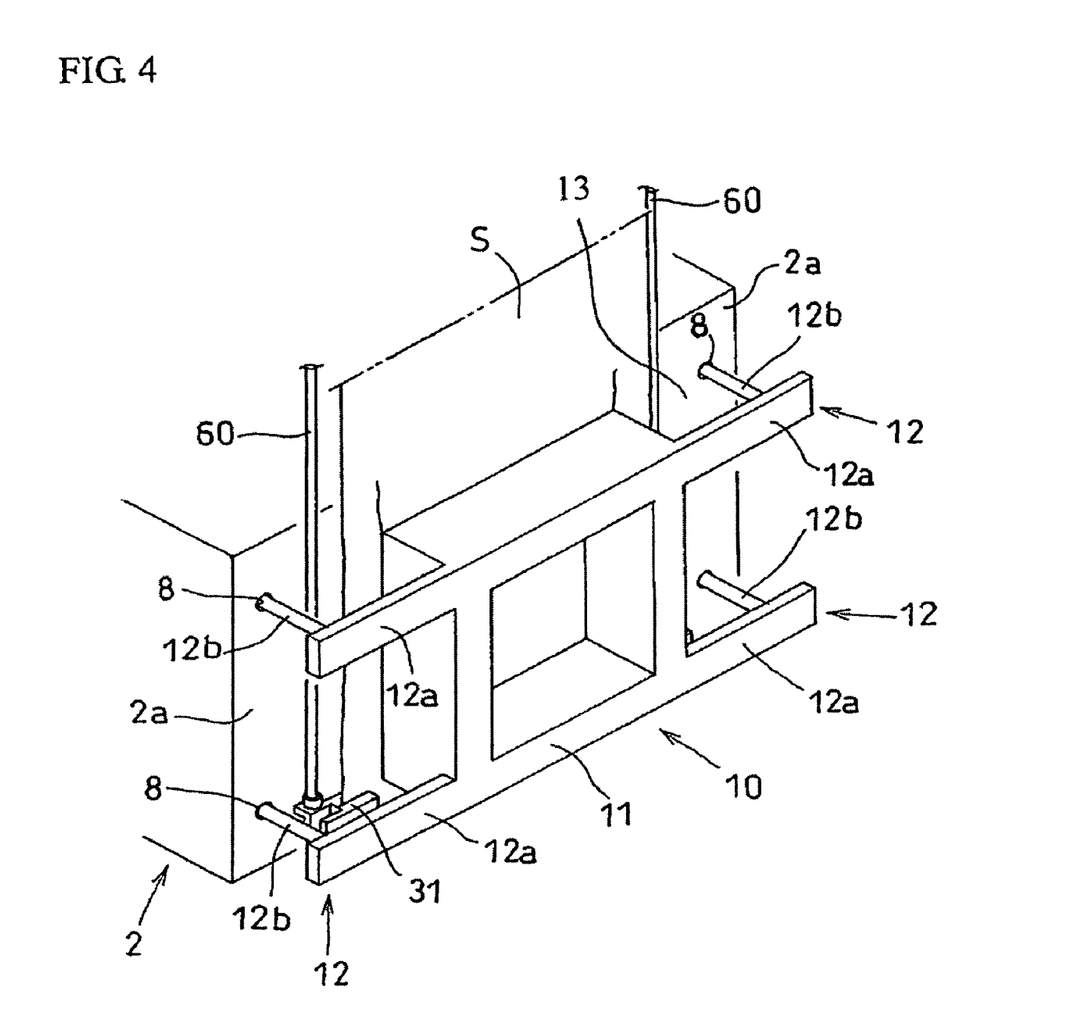
FIG. 4 shows a view of the apparatus shown in FIG. 1 for the explanation of a decorative sheet fixing step.

The pushing frame 11 of the clamper 10 has a greater thickness than the bridging portions 12 in the direction of the parting surface 2a of the female mold 2. Thus, as shown in FIG. 4, when the decorative sheet S is pressed and fastened by the clamper 10, only the pushing frame 11 abuts on the female mold 2 via the decorative sheet S and a space 13 is formed between each of the bridging portions 12 and the female mold 2. The measurements of each element of the clamper are determined such that each clamping device 31 of the transport chuck 30 can be passed through this space 13.

EXAMPLES

An example of a foil-decorating injection molding method utilizing the foil-decorating injection molding apparatus 1 of the above-described structure will be hereafter described.

The decorative sheet RS of the elongated band shape wound in a roll is drawn out by the feed rollers 72, and the left and right side edges of a tip Sa of the decorative sheet S are clamped by the clamping devices 31,31 of the transport chuck 30, as shown in FIG. 2. Then, the transport chuck 30 is moved vertically downward between the parting surface 2a of the female mold 2 and the clamper 10 until the lower edge of the decorative sheet S reaches near the lower edge of the pushing frame 11 of the clamper 10. The decorative sheet S is then pressed and fastened by the clamper 10, as shown in FIG. 4. The decorative sheet S is pressed and fastened by the pushing frame 11 of the clamper 10 at the peripheral edges of a cavity 4 above the parting surface 2a of the female mold 2. As a result, the space enclosed by the cavity 4 and the decorative sheet S is airtightly sealed. In this state, a space 13 is formed between each of the bridging portions 12a of the clamper 10 and the parting surface 2a of the female mold 2, so that each of the clamping devices 31, 31 can be accommodated in the space 13 formed between the two bridging portions 12a, 12a on the left and right located beneath the clamper 10 and the female mold 2.

Figure 5:
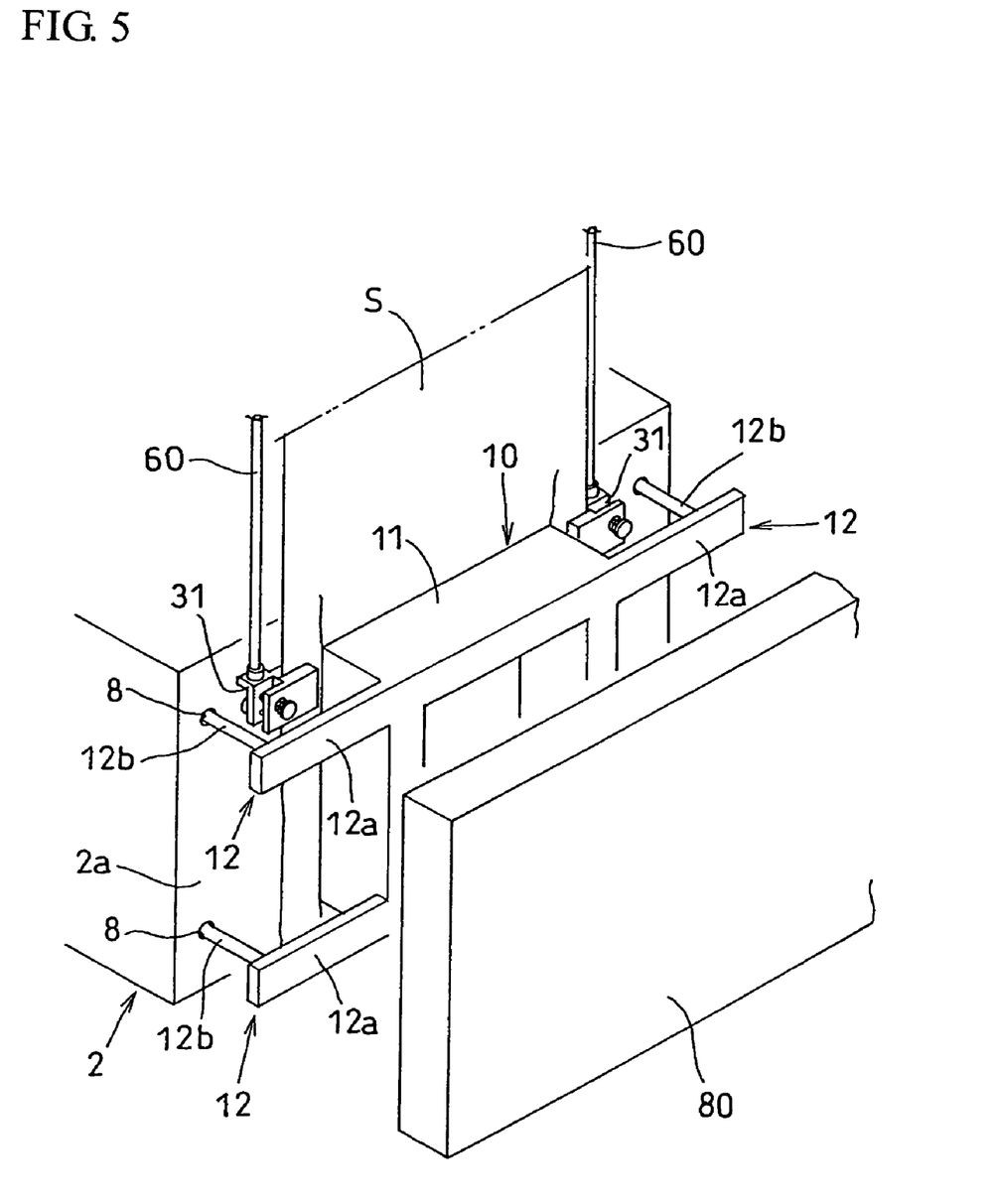
FIG. 5 shows a view of the apparatus shown in FIG. 1 for the explanation of a decorative sheet heating step.

Thereafter, the heating panel 80 that has up to now been withdrawn outside the areas between the female and male molds is moved to a position immediately opposite the clamper 10, as shown in FIG. 5. At the same time, the clamping devices 31, 31 release the decorative sheet S and then rise back to their original position shown in FIG. 2. This is followed by the conventional steps, namely: the decorative sheet heating/softening step (see FIG. 11); the drawing step; the female/male mold clamping step; the injection molding step (see FIG. 12); the die opening step; and the mold-article removing step, thereby completing a decorative molded article.

Figure 6:
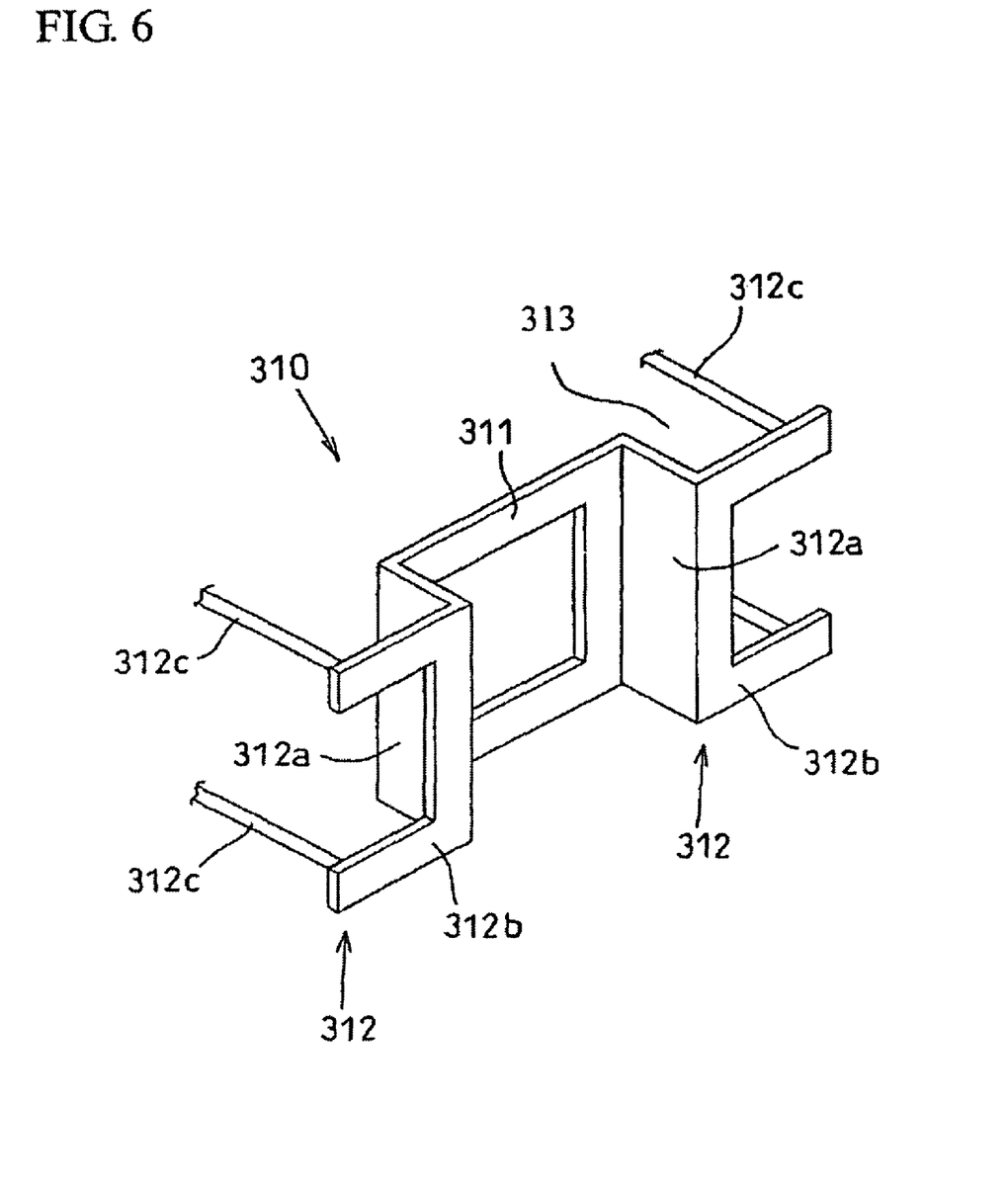
FIG. 6 shows a perspective view of another embodiment of a clamper used in the foil-decorating injection molding apparatus shown in FIG. 1.

FIG. 6 shows another embodiment of the clamper that can be used in the above-described foil-decorating injection molding apparatus 1. A clamper 310 shown in FIG. 6 consists of a rectangular pushing frame 311 that abuts the parting surface 2a of the female mold 2 via the decorative sheet S when the decorative sheet S is pressed and fastened, and a left and a right connecting member 312 for connecting the pushing frame 311 and a drive means (not shown). Each of the connecting members 312 consists of: two vertical plates 312a on either side of the pushing frame 311 that extend vertically away from the parting surface 2a of the female mold 2; four connecting rods 312c slidably inserted in the throughholes 8 provided in the female mold 2 near the four corners thereof; and two bridges 312b on either end connecting the vertical plates 312a and the connecting rods 312c in a plane parallel to the parting surface 2a of the female mold 2. In this structure, when the decorative sheet S is pressed and fastened by the clamper 310, only the pushing frame 311 abuts the female mold 2 via the decorative sheet S, and between each bridge 312b and the female mold 2, there is formed a space 313 which the clamping device 31 of the transport chuck 30 can be passed. This clamper 310 may be used in the same process as that for the previously described clamper 10 to obtain a molded article.

Figure 7:
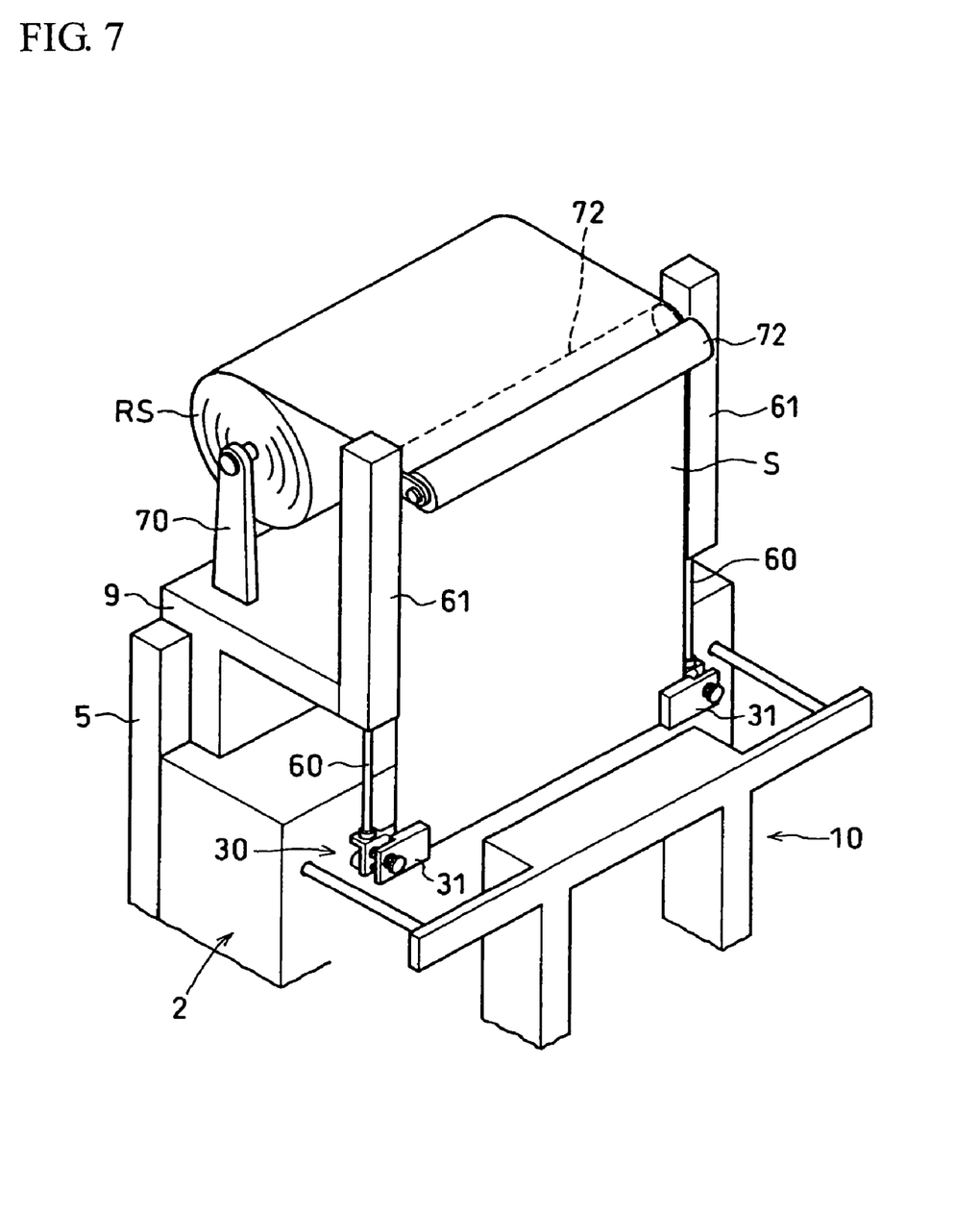
FIG. 7 shows a perspective view of an example of how a reel and a drive unit are installed in the foil-decorating injection molding apparatus of the invention.

The drive unit for the transport chuck 30 and a reel 70 for the decorative sheet S may be fixed to the female mold 2 via suitable members, as shown in FIG. 7. In the illustrated example, a mount 9 is installed on top of the movable platen 5 to which the female mold 2 is fixed, and the drive units 61 and the reel 70 are mounted on the mount 9. At the lower edge of the drive units 61, the transport rods 60 with the clamping devices 31 attached to the tip thereof extend downwards, allowing the clamping devices 31 to be moved up and down in the space between the female mold 2 and the clamper 10. The feed roller 72 is attached to the upper portion of the drive unit 61, and the decorative sheet RS wound on the reel 70 can be unreeled via the feed roller 72 and grasped by the clamping devices 31. In this mode of installation, the clamping devices 31 can be moved up and down between the female mold 2 and the clamper 10 even while the movable platen 5 is moving. Thus, after one molded article has been injection-molded, a new decorative sheet S can be fed while the female mold 2 and the male mold 20 are being separated, thereby allowing production time to be further shortened.

Various other embodiments of the foil-decorating injection molding apparatus of the invention are possible. For example, a groove may be provided in the parting surface 2a of the female mold 2 along the transport path of the transport chuck 30 so that a part of the transport rods 60 and the transport chuck 30 travels within the groove. In this way, the decorative sheet S can be fed to a position closer to the parting surface 2a such that it can be more smoothly pressed and fastened by the clamper 10. As an alternative means of moving the transport chuck 30, instead of the transport rods 60, a guide rail may be provided along the transport path of the clamping devices 31 between the female mold 2 and the clamper 10 in advance, so that the clamping devices 31 can travel along this guide rail. In another example, the clamper 10 may be connected to the drive means outside the female mold 2, rather than through the inside of the female mold 2 as in the foregoing embodiment.

INDUSTRIAL APPLICABILITY

In accordance with the foil-decorating injection molding apparatus of the invention, a plurality of operations are performed simultaneously so that production time can be shortened. Further, the need to unreel an extra length of the decorative sheet is eliminated, thereby allowing the sheet to be utilized efficiently.

The invention claimed is:

1. A foil-decorating injection molding apparatus comprising at least a male mold, a female mold, a transport chuck for feeding a decorative sheet between said male mold and said female mold, and a clamper for pressing and fastening said sheet on a flat parting surface of said female mold, wherein:
    said transport chuck comprises two clamping devices by which both side edges of said decorative sheet can be clamped; and said clamper comprises a pushing frame that abuts on said parting surface of said female mold via said decorative sheet when said decorative sheet is pressed and fastened, and at least one connecting member that extends from said pushing frame, said connecting member being connected to means of driving said pushing frame, wherein:
    said clamper is formed in such a shape that, said connecting member is spaced apart from said parting surface when said pushing frame is in abutment with said parting surface of said female mold, such that there is established a space between said connecting member said parting surface, said driving means and said pushing frame in which said entire clamping devices pass therethrough.

2. The foil-decorating injection molding apparatus according to claim 1, wherein said transport chuck is movable in the direction perpendicular to the direction in which said male mold and said female mold are moved towards or away from each other, the position of said transport chuck is fixed with respect to said female mold in said direction, and said decorative sheet is fed from a reel fixed to said female mold.

3. A foil-decorating injection molding method that employs the foil-decorating injection molding apparatus according to claim 1, said method comprising feeding said decorative sheet between said male mold and said female mold by moving said clamping devices of said transport chuck with said decorative sheet being clamped by said clamping devices, pressing and fastening said sheet onto said parting surface by said clamper, releasing the grasping of said sheet by said clamping devices while maintaining the pressed state, and bringing said clamping devices back to their original position through the space between said clamper and said female mold.

4. A foil-decorating injection molding method employing the foil-decorating injection molding apparatus according to claim 2, said method comprising: feeding said decorative sheet between said male mold and said female mold by moving said clamping devices of said transport chuck with said sheet being clamped by said clamping devices; pressing and fastening said sheet onto said parting surface of said female mold by said clamper; releasing the grasping of said sheet by said clamping devices while maintaining the pressed state; bringing said clamping devices back to their original position through the space between said clamper and said female mold; and separating said female mold and said female mold while simultaneously feeding a new decorative sheet between said male mold and said female mold by said transport chuck.

5. A foil-decorating injection molding apparatus comprising:
- at least a male mold,
- a female mold,
- a transport chuck for feeding a decorative sheet between said male mold and said female mold, and
- a clamper for pressing and fastening said sheet on a flat parting surface of said female mold,
  wherein:
  - said transport chuck comprises two clamping devices by which both side edges of said decorative sheet are clamped; and
  - said clamper comprises a pushing frame that abuts on said parting surface of said female mold via said decorative sheet when said decorative sheet is pressed and fastened, and at least one connecting member that extends from said pushing frame, said connecting member being connected to a connecting rod that drives said pushing frame, and
  - wherein; said clamper is formed in such a shape that, said connecting member is spaced apart from said parting surface when said pushing frame is in abutment with said parting surface of said female mold, such that a space is established between said connecting member, said parting surface, said connecting rod and said pushing frame in which said entire clamping devices pass therethrough.

6. A foil-decorating injection molding apparatus comprising:
- a male mold,
- a female mold, and
- a clamper for pressing and fastening a decorative sheet on a flat parting surface of said female mold,
  wherein:
  - said clamper comprises a pushing frame that abuts on said parting surface of said female mold via said decorative sheet, and at least one connecting member that extends from said pushing frame, said connecting member being connected to means of driving said pushing frame,
  - said clamper is formed in such a shape that, said connecting member is spaced apart from said parting surface when said pushing frame is in abutment with said parting surface of said female mold, such that there is established a space between said connecting member and said parting surface;
  - said apparatus further comprising means for feeding said decorative sheet between said male mold and said female mold prior to abutment of said pushing frame with said parting surface, while grasping both side edges of said decorative sheet and for releasing grasp of said decorative sheet while said clamper maintains the pressed state of said decorative sheet and said entire means for feeding said decorative sheet returning back to an original position through the space between said connecting member of said clamper, said parting surface, said driving means and said pushing frame.

* * * * *

UNITED STATES PATENT AND TRADEMARK OFFICE
CERTIFICATE OF CORRECTION

Page 1 of 1

PATENT NO.        : 8,033,807 B2
APPLICATION NO.   : 10/569229
DATED             : October 11, 2011
INVENTOR(S)       : Hiroyuki Atake It is certified that error appears in the above-identified patent and that said Letters Patent is hereby corrected as shown below:

Column 8, line 38 insert --,-- after member.

Signed and Sealed this
Twenty-eighth Day of February, 2012

David J. Kappos
*Director of the United States Patent and Trademark Office*